July 16, 1940.   S. FRANCK ET AL   2,208,415
INDUCTION METER
Filed Nov. 27, 1937

WITNESSES:

INVENTORS
Siegfried Franck &
Georg Mahr
BY
ATTORNEY

Patented July 16, 1940

2,208,415

UNITED STATES PATENT OFFICE 2,208,415

INDUCTION METER

Siegfried Franck, Stein, near Nuremberg, and Georg Mohr, Nuremberg, Germany, assignors to Westinghouse Electric & Manufacturing Company, East Pittsburgh, Pa., a corporation of Pennsylvania Application November 27, 1937, Serial No. 176,904
In Germany February 16, 1937

4 Claims. (Cl. 171—264)

The present invention relates to compensating means for electromagnets and more particularly to an adjustable overload shunt compensator for the driving magnet of a watthour meter. It will be obvious that the invention is capable of quite wide application, but for purposes of convenience, it will be described in connection with the series electromagnet of a watthour meter of the induction type.

In the usual type of watthour meter, the registration curve, that is, the curve plotted in percentage accuracy against the percentage of rated load current, is reasonably flat at 100% accuracy within the rated load of the meter and for some distance beyond. However, with the tendency toward increasing loads, currents as high as 300% and 400% of the rated current or load are frequently encountered. At the higher ranges of load, the increased amount of flux imposed upon the disk armature of the meter causes a "self-damping" action such that the speed of the armature no longer is an accurate representation of the energy of the metered circuit.

This self-damping effect is usually counteracted by means of a saturable magnetic shunt bridging the pole tips of the series magnet so that as the current flux increases to a point where the shunt becomes of markedly decreased magnetic permeability, a smaller amount of flux will traverse the shunt and hence a larger amount will traverse the disk armature. The shunts are usually so designed that the increased amount of flux through the armature is sufficient to compensate for the self-damping effect and the registration curve of the meter will be raised as desired.

The magnetic shunts are usually secured between the pole tips of the current magnet and spaced therefrom by non-magnetic material such as aluminum, brass or air. It has been found, however, that small changes in the properties of the shunt material, the width of the air-gap or spacer between the shunt and the pole tips, and other influences, are sufficient to change the effectiveness of the shunt. That is, the shunt action will not be uniform for all meters having supposedly the same design of shunt and current electromagnet. It is desirable, therefore, that some means be provided for adjusting the shunt to obtain uniform results, but adjustments such as changing the dimensions of the shunt, have the disadvantage that when the dimensions are changed, although the shape of the registration curve at overloads may be obtained as desired, there is also a change in the shape of the curve at low loads within the rated current range of the meter. This is due to the fact that a change in magnetic reluctance of the shunt, and hence the reluctance of the series magnet as a whole, produced by adjustment become quite noticeable at low values of flux.

It is a purpose of the present invention to provide an overload shunt for an electromagnet of the watthour meter type, with means to adjust the effectiveness of the shunt.

It is a further object of the invention to provide an adjustable overload shunt for an electromagnet which will afford a desired compensating action, and in which the change in adjustment will have no effect upon the operation of the electromagnet at low loads.

Other objects of the invention will be apparent from the following description and accompanying drawing in which.

Figure 1:
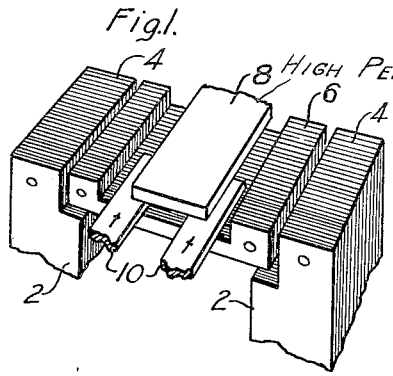
Figure 1 is a schematic showing, in perspective of a portion of an electromagnet embodying the present invention.

Referring more particularly to Fig. 1, the current electromagnet 2 of a watthour meter, for example, may comprise a laminated magnetic structure substantially of U-shape having pole portions 4 and confronting recesses in the pole portions for receiving a magnetic shunt 6. The magnetic shunt may be laminated or solid as desired, and is magnetically insulated from the pole portions 4 by non-magnetic spacers such as copper, aluminum and the like. For purposes of clearness, spacers are not shown in Fig. 1 and the shunt is magnetically insulated by means of the air space shown. The shunt, in accordance with usual practice, is of such cross-sectional area, or of such material, that as the amount of flux traversing the shunt increases, a point is reached where the magnetic permeability markedly decreases. This is usually referred to as the saturation point, although strictly speaking complete saturation does not occur. It is a point on the permeability curve adjacent to the knee thereof where the amount of flux traversing the shunt does not increase in proportion to the increased energization of the series winding, but at a markedly lower rate.

The structure described is more or less well known, and as above pointed out, variations in the air gap, or magnetic insulation, between the shunt and pole portions, or variations in different batches of material used in the shunt and magnetic structure of the electromagnet, may cause a difference between the action of the shunts in various meters; that is, the so-called saturation may occur at different degrees of energization of the winding of the electromagnet 2.

In order to make the shunt actions of meters more uniform, it is proposed that the action of the shunt shall be made adjustable. This may be accomplished as indicated diagrammatically in Fig. 1 by means of a supporting member 8 of relatively high permeability and a pair of movable magnetic members 10, preferably supported from the member 8 in a manner to permit movement of the members 10 across the face of the shunt. The members 10 are intended to be in contact with the member 8, but suitably magnetically insulated from the shunt 6 by means of an air space, as shown, or suitable non-magnetic spacers. By moving the members 10 across the face of the shunt, the effectiveness of the shunt action may be altered. That is, instead of the flux shunted across the pole portions 4 being limited to a definite quantity in accordance with the so-called saturation of the shunt 6, the shunted flux may be varied by altering the magnetic path between the pole portions 4, the shunt 6 and the member 8.

When the meter is operated within its rated load, and the shunt 6 is well below its point of saturation, the magnetic drop along the shunt will be negligible, and consequently there will practically be no lines of force traversing the member 8 through the members 10. However, during overload conditions where the energization of the magnet winding is quite high, and the shunt 6 is approaching saturation, there will be a drop in magnetic potential along the shunt and there will be a tendency for lines of force to be directed through the members 10 and member 8. By altering the positions of the members 10, more or less of these lines of force will traverse the member 8 and hence vary the action of the shunt as a whole. By means of this construction, therefore, the action of the shunt on overload may be adjusted and the adjusting means has no effect upon the magnetic reluctance of the series electromagnet as a whole at low loads or loads well below the saturation point of the shunt.

Figure 2:
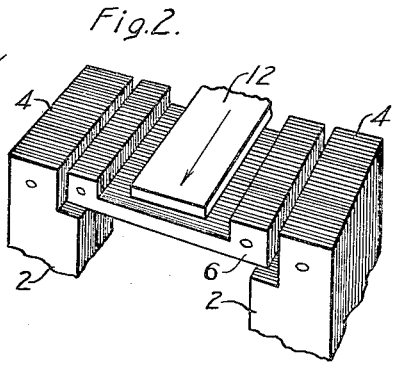
Fig. 2 is a view similar to Fig. 1 showing another modification of the invention.

A modification is shown in Fig. 2 in which the adjustment of the shunt action is obtained by a single piece of magnetic material 12 magnetically separated from the shunt 6. It is intended that the member 12 will be movable across the face of the shunt in any suitable manner.

Figure 3:
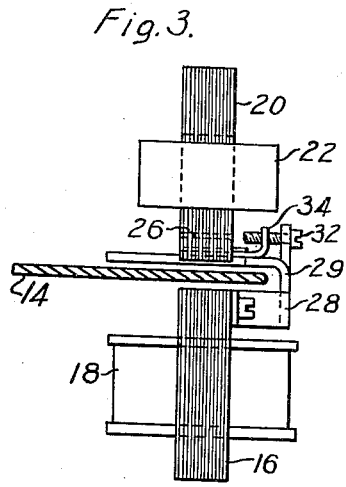
Fig. 3 is a view in side elevation, partially in section, of a meter electromagnet embodying the invention.
Figure 4:
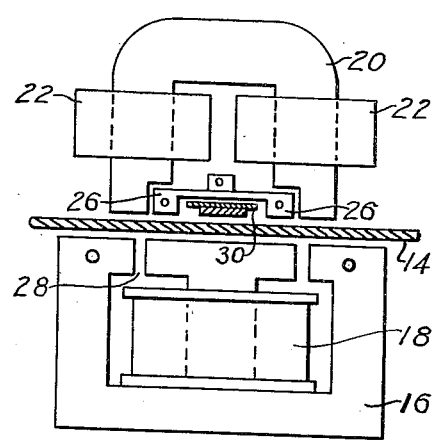
Fig. 4 is a view in front elevation, partly in section, of the structure shown in Fig. 3.

A more specific application of the invention to a meter element is shown in Figs. 3 and 4, wherein the element comprises a rotatable disk armature 14, schematicaly shown in section, upon one side of which is mounted the voltage electromagnet 16 including a winding 18 to be energized in accordance with the voltage of the circuit to be metered, and a current electromagnet 20 having a pair of coils 22 for connection in series with the metered circuit, and a shunt 26 corresponding to shunt 6 in Figs. 1 and 2. As in Figs. 1 and 2, the shunt 26 is shown as being magnetically insulated from the core of the electromagnet by an air space, but obviously any well known means for effecting this result may be resorted to.

Figure 5:
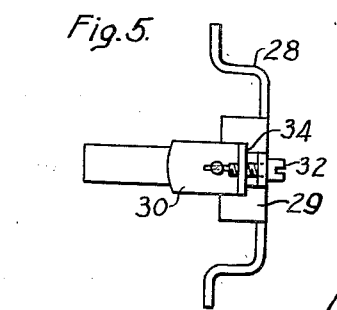
Fig. 5 is a plan view of an element shown in Fig. 3.

In order to support the shunt adjusting device, a bracket 28, shown more in detail in Fig. 5, may be used. Such bracket may comprise an angle member having the ends thereof secured to the core of the voltage magnet as indicated in Figs. 3 and 4, and is provided with a central portion 29 which extends upwardly toward the series electromagnet and then across the face of the shunt 26. The shunt adjusting member 30, corresponding to the members 10 in Fig. 1, or member 12 in Fig. 2, is slidably mounted upon the central portion 29 of the bracket extending across the face of the shunt, and is adjustably maintained in position by a screw 32 loosely extending through a lug on the portion 29 of the bracket 28 and threaded through a confronting bracket 34 integral with the adjusting member 30. By the construction shown quite obviously the adjusting member may be moved across the face of the shunt to a desired position.

Figure 6:
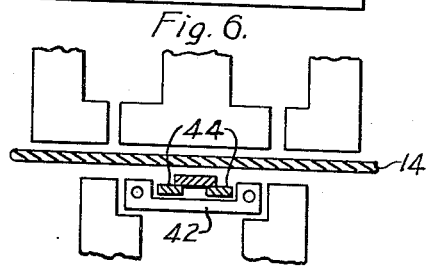
Fig. 6 is a schematic showing, partly in section, of a modified form of the invention.
Figure 7:
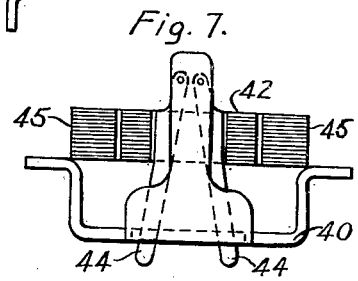
Fig. 7 is a detail of the structure shown in Fig. 6.

A further modification is indicated in Figs. 6 and 7. In this case the bracket 40, corresponding to bracket 28 in Figs. 3 and 5, has pivotally secured to it, on the portion extending across the face of the shunt 42, a pair of levers 44 of magnetic material which may be adjustably positioned with respect to the pole portions 45 of the series magnet for movement longitudinally of the shunt to obtain the resired shunt action.

In all of the modifications disclosed, a desirable adjustability of the shunt action under overload conditions on the meter is obtained, and by reason of the arrangement of the parts, such adjustment has no effect upon the operation of the meter at low-load ranges within the rating of the meter, or below the point where the decrease in permeability of the overload shunt, or so-called saturation conditions, occurs.

Quite obviously other modifications may be devised, and it is intended that the invention be limited only by the scope of the appended claims.

We claim as our invention:

1. In a magnetic structure having a pair of spaced pole portions adjacent to an armature and a winding for energizing the structure to induce a flux for traversing said armature, a magnetic shunt extending between said pole portions and having a permeability which markedly decreases when the flux induced by said winding attains a predetermined value, thereby increasing the flux traversing said armature, and adjustable means operatively positioned relative to flux induced by said winding for varying the effectiveness of said shunt for a given energization of said winding only when the energization of the winding is such that the flux traversing the shunt is above such predetermined value, said adjustable means being spaced from said magnetic shunt.

2. In a magnetic structure having a pair of spaced pole portions adjacent to an armature and a winding for energizing the structure to induce a flux for traversing said armature, a magnetic shunt extending between said pole portions and having a permeability which markedly decreases when the flux induced by said winding attains a predetermined value, thereby increasing the flux traversing said armature, and adjustable means for varying the effectiveness of said shunt for a given energization of said winding only when the energization of the winding is such that the flux traversing the shunt is above such predetermined value, including a member of magnetic material and means for movably mounting it between said pole portions and adjacent to but out of contact with said shunt.

3. In a magnetic structure having a pair of spaced pole portions adjacent to an armature and a winding for energizing the structure to induce a flux for traversing said armature, a magnetic shunt extending between said pole portions and having a permeability which markedly decreases when the flux induced by said winding attains a predetermined value, thereby increasing the flux traversing said armature, and adjustable means for varying the effectiveness of said shunt for a given energization of said winding only when the energization of the winding is such that the flux traversing the shunt is above such predetermined value, including a member of magnetic material and means for mounting it between said pole portions and adjacent to but out of contact with said shunt, and means for varying the magnetic circuit between said shunt and member.

4. In a watthour meter electromagnet including a rotatable disc armature and a series electromagnet having a pair of pole portions adjacent thereto and a winding thereon for inducing a flux in said armature, and a magnetic shunt bridging said pole portions and magnetically insulated therefrom and being of such dimension that it will saturate at a predetermined energization of said winding to cause an increased amount of flux to reach said armature, and means effective substantially only at such predetermined energization for adjustably varying the amount of flux shunted across said pole portions comprising a member of high permeability, and a magnetic element adjustably secured to said member for movement across said shunt but out of contact therewith.

SIEGFRIED FRANCK.
GEORG MOHR.